US010305976B2

(12) United States Patent
Lin et al.

(10) Patent No.: US 10,305,976 B2
(45) Date of Patent: May 28, 2019

(54) METHOD AND APPARATUS FOR DYNAMICALLY OFFLOADING EXECUTION OF MACHINE CODE IN AN APPLICATION TO A VIRTUAL MACHINE (71) Applicant: Intel Corporation, Santa Clara, CA (US)

(72) Inventors: Chit Kwan Lin, New York, NY (US); Arnab Paul, Hillsboro, OR (US); Gautham N. Chinya, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 431 days.

(21) Appl. No.: 14/860,241

(22) Filed: Sep. 21, 2015

(65) Prior Publication Data

US 2017/0085636 A1    Mar. 23, 2017

(51) Int. Cl.
G06F 15/173    (2006.01)
H04L 29/08    (2006.01)
(52) U.S. Cl.
CPC ...... *H04L 67/1031* (2013.01); *H04L 67/1008* (2013.01); *H04L 67/1095* (2013.01)
(58) Field of Classification Search
USPC .......... 709/223, 217, 218, 231, 246
See application file for complete search history.

(56) References Cited

U.S. PATENT DOCUMENTS

| 8,667,456 | B1* | 3/2014 | Czymontek | G06F 8/315 717/100 |
| 9,588,807 | B2* | 3/2017 | Alanis | G06F 9/4856 |
| 2005/0246402 | A1 | 11/2005 | Wu et al. | |
| 2006/0184713 | A1* | 8/2006 | Hildner | G06F 12/1036 711/6 |
| 2006/0184718 | A1* | 8/2006 | Sinclair | G06F 3/0608 711/103 |
| 2011/0231469 | A1* | 9/2011 | Wolman | G06F 9/5094 709/201 |
| 2013/0227236 | A1* | 8/2013 | Flynn | G11C 16/26 711/165 |
| 2014/0310709 | A1 | 10/2014 | Nirantar | |
| 2017/0329834 | A1* | 11/2017 | O'Neill | G06F 17/30575 |

OTHER PUBLICATIONS

International Preliminary Report on Patentability for PCT Patent Application No. PCT/US16/47929, dated Apr. 5, 2018, 13 pages.
International Search Report and Written Opinion for PCT Patent Application No. PCT/US16/47929, dated Nov. 25, 2016, 11 pages.

* cited by examiner

*Primary Examiner* — Lan Dai T Truong
(74) *Attorney, Agent, or Firm* — Compass IP Law PC (57) ABSTRACT A method for managing computing includes replicating a subset of a machine state of a first computing device onto a second computing device, wherein the subset of the machine state is required to execute machine code. Execution of the machine code is offloaded to the second computing device.

26 Claims, 9 Drawing Sheets

METHOD AND APPARATUS FOR DYNAMICALLY OFFLOADING EXECUTION OF MACHINE CODE IN AN APPLICATION TO A VIRTUAL MACHINE

TECHNICAL FIELD

An embodiment of the present disclosure pertains to cloud computing for mobile devices. More specifically, an embodiment of the present disclosure relates to a method and apparatus for performing dynamic offloading of arbitrary machine code in an application to a virtual machine.

BACKGROUND

Traditionally, cloud computing is the practice of using a network of servers that are hosted remotely to store, manage, and process data in place of using a local server or computing device. Cloud computing has provided a model for enabling network access to a shared pool of configurable computing resources. Together with storage solutions, cloud computing has provided users with various capabilities to store, manage, and process their data using third-party data centers. Cloud computing utilizes the sharing of resources to achieve coherence and economies of scale.

Mobile devices are often constrained by resources, such as processing power, battery life, and available storage space. The constraints on these resources may limit mobile devices from delivering the range of rich mobile experiences that users may desire. Despite the arrival of new technologies to improve processing power, battery life, and storage space on mobile devices, the growing sophistication and requirements of mobile applications push against the limits of the resources.

Mobile cloud computing uses a combination of cloud computing, mobile computing, and wireless networks to bring additional computational resources to mobile users. Mobile cloud computing may leverage elastic resources of varied clouds and network technologies toward increased functionality, storage, and mobility to serve a multitude of mobile devices anywhere and anytime regardless of heterogeneous environments and platforms.

BRIEF DESCRIPTION OF THE DRAWINGS

The features and advantages of embodiments of the present disclosure are illustrated by way of example and are not intended to limit the embodiments of the present disclosure to the particular embodiments shown.

DETAILED DESCRIPTION

In the following description, for purposes of explanation, specific nomenclature is set forth to provide a thorough understanding of embodiments of the present disclosure. It will be apparent to one skilled in the art that specific details in the description may not be required to practice the embodiments of the present disclosure. In other instances, well-known circuits, devices, procedures, and programs are shown in block diagram form to avoid obscuring embodiments of the present disclosure unnecessarily.

Offloading complex computation from a mobile computing device to a server on a cloud may be achieved using a dedicated web service that implements a priori defined functions. This may be inflexible as it precludes shifting arbitrary workloads to the server on the cloud at runtime. For instance, current dedicated web services may only allow offloading of workloads that are specified at an application level and not at a level of machine instruction.

According to an embodiment of the present disclosure, a framework is provided to facilitate offloading of an arbitrary workload, i.e., an arbitrary block of machine code, from a first computing device to a second computing device at the granularity of machine instructions. In this embodiment, execution on the first computing device is suspended and a subset of its machine state is captured. The subset of the machine state captured includes what is minimally required to run a desired code block remotely. The subset of the machine state may include the contents of the computing device's registers and portions of its virtual memory, including the stack, heap, block started by symbol (BSS) data, and text. The subset of the machine state of the first computing device is replicated to the second computing device where it is dynamically injected into a virtual machine that executes the offloaded code block. According to an embodiment of the present disclosure, the virtual machine may be an ultra-lightweight virtual machine which includes only a virtual central processing unit and virtual memory. The ultra-lightweight virtual machine need not run an operating system. The ultra-lightweight virtual machine also need not include a virtual disk, virtual network interfaces or other virtual devices.

After the virtual machine on the second computing device has completed executing the offloaded code, the virtual machine's machine state from the second computing device is replicated onto the first computing device as an updated subset of machine state. This allows the first computing device to resume execution from the new state. This framework provides a tight coupling which blurs the boundary between the first and second computing devices. As a result, it appears to the user of the first computing device that the first computing device performed the offloaded computation itself.

Embodiments of the present disclosure allow arbitrary workloads that are specified at a level of machine instruction rather than at the application level to be offloaded from a first computing device to be executed on a second computing device. A framework is disclosed that facilitates hand-off, resumption of device execution on the first computing device, proper machine state transfer, and guest code execution on the second computing device.

According to a first embodiment of the present disclosure, a method for managing computing includes replicating a subset of a machine state of a first computing device onto a second computing device, wherein the subset of the machine state is required to execute machine code. Execution of the machine code is offloaded to the second computing device. According to an embodiment of the disclosure, a subset of machine state refers to a proper subset of the machine state.

According to a second embodiment of the present disclosure, a method for managing computing includes creating a virtual machine for a client on a server. A replicated machine state and machine code received from the client is injected into the virtual machine. Control of computing resources on the server is handed to the virtual machine to execute the machine code. Control of the computing resources is returned to the server upon completion of the execution of the machine code.

Embodiments of the present disclosure may provide potential advantages such as providing freedom from a priori design choice. Prior approaches such as web services require an application programmer to decompose an application into distinct functional units for remote execution. Such an abstraction is fixed at compile-time and cannot be altered at runtime. Embodiments of the present disclosure enable dynamic offloading of arbitrary code blocks at runtime.

Embodiments of the present disclosure may provide the potential advantage of using a generalized server. Prior approaches such as web services require special-purpose servers to be configured to implement each supported service. Embodiments of the present disclosure allow a general purpose server to implement instruction-level offloading. This allows a general purpose server to handle different types of computations and services without requiring it to be pre-configured in a manner specific to the supported service.

Embodiments of the present disclosure may provide the potential advantage of designating portions of existing applications to be offloaded dynamically, ex post facto. Existing code on a first computing device does not need to be refactored or rewritten to take advantage of offloading.

Embodiments of the present disclosure may provide the potential advantage of perceived responsiveness at the first computing device end. The first computing device's machine state is continuously updated on the second computing devices. A current version of the first computing device's memory is available "just in time" for an offloaded code block to be executed by the second computing device. As a result, offloading does not suffer a long delay.

Embodiments of the present disclosure may provide the potential advantage of accelerating complex computations. For example, a server may be able to perform complex computations faster than a client implemented by a mobile device. This allows for accelerations in performance.

Embodiments of the present disclosure may provide the potential advantage of conserving power on a first computing device offloading execution of machine code onto a second computing device.

Figure 1:
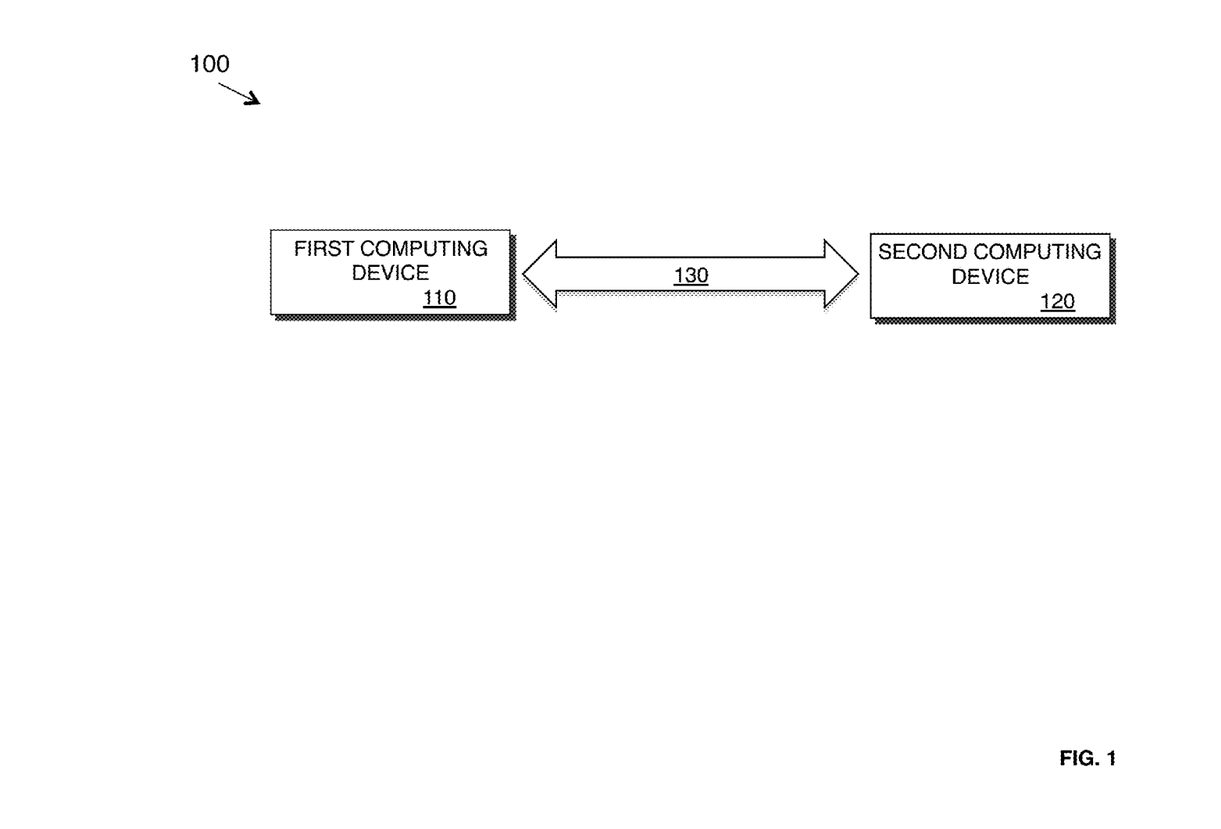
FIG. 1 is a block diagram of an environment for cloud computing according to an exemplary embodiment of the present disclosure.

FIG. 1 is a block diagram of an environment for cloud computing 100 according to an exemplary embodiment of the present disclosure. The environment for cloud computing 100 includes a first computing device 110 and a second computing device 120. The first computing device 110 operates as a client and may be implemented by a desktop or laptop computer system, smart phone, tablet, smart watch, smart appliance, or other computing device. The second computing device 120 operates as a server that resides remotely from the first computing device 110 in a cloud. The second computing device 120 may be implemented by any of the computing devices listed for the first computing device 110 or by a computing device with significantly higher processing power such as a network computer, server computer, mainframe computer, supercomputer, or other computing device. According to an embodiment of the present disclosure, the first computing device 110 may upload one or more blocks of machine code to the second computing device 120 to execute.

The first computing device 110 may be connected to the second computing device 120 through network 130. According to an embodiment of the present disclosure, the network 130 may be a mobile network. The mobile network may include components such as one or more base transceiver stations, access points, and/or satellites that transmit signals between the first computing device 110 and a mobile network service. The mobile network service may be connected to the second computing device 120 via the Internet. It should be appreciated, that the network 130 may also be a different type of network utilizing a combination of other components and communication media.

Figure 2:
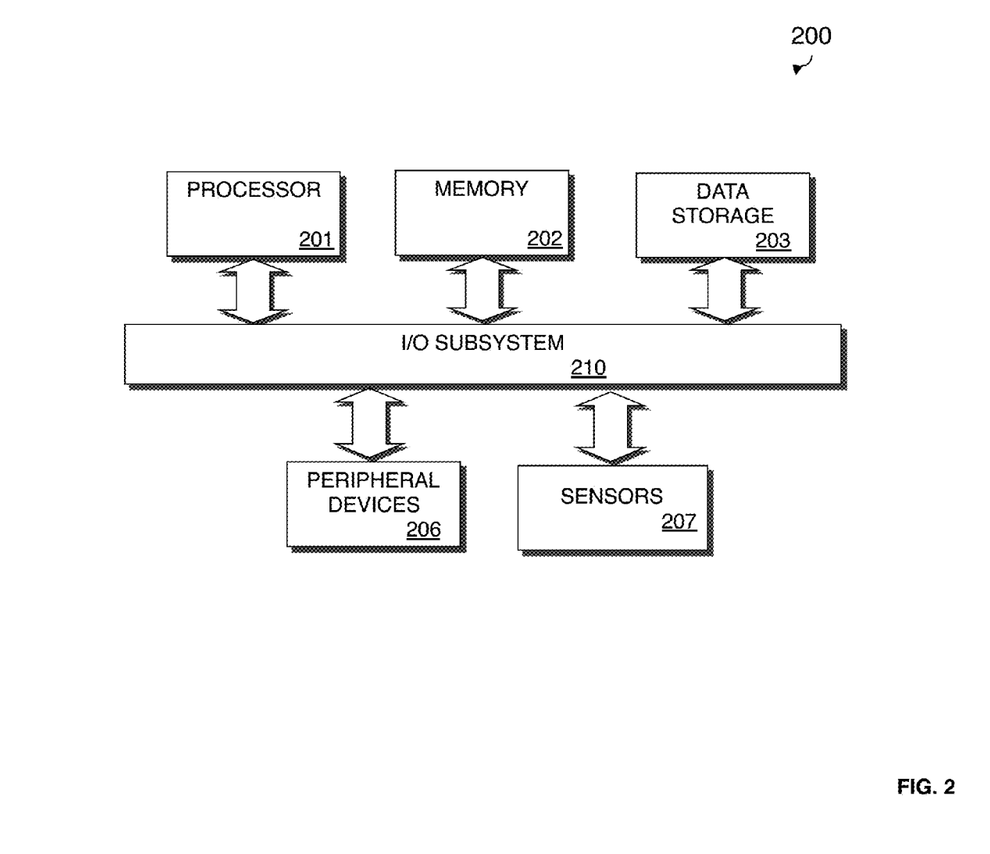
FIG. 2 is a block diagram of a computing device according to an exemplary embodiment of the present disclosure.

FIG. 2 is a block diagram of a computing device 200 according to an exemplary embodiment of the present disclosure. The computing device 200 may be used to implement the first computing device 110 or the second computing device 120 illustrated in FIG. 1. The computer system 200 includes a processor 201 that processes data signals. FIG. 2 shows the computer system 200 with a single processor. However, it is understood that the computer system 200 may operate with multiple processors. The processor 201 may be implemented by a single or multi-core processor(s), digital signal processor, microcontroller, or other processor or processing/controlling circuit.

The processor 201 is coupled to an input/output (I/O) subsystem 210. The I/O subsystem 210 may include memory controller hubs, I/O control hubs, communication links, and/or other components and subsystems to facilitate I/O operations. According to an embodiment of the computing device 200, the I/O subsystem 210 transmits data signals between components in the computing device 200. In this embodiment, the I/O subsystem 210 may include a single bus or a combination of multiple buses. The computing device 200 includes a memory 202. The memory 202 is coupled to the I/O subsystem 210. The memory 202 may be a dynamic random access memory device, a static random access memory device, and/or other memory device. The memory 202 may store instructions and code represented by data signals that may be executed by the processor 201. A data storage device 203 is coupled to the I/O subsystem 210. The data storage device 203 may be implemented with a device configured for short-term or long-term storage of data such as a solid state drive, memory card or other data storage device.

Peripheral devices 206 are coupled to the I/O subsystem 210. The peripheral devices 206 may include various I/O devices such as devices that support communication and display. The peripheral devices 206 may include display and touch screens, buttons, switches, keyboard, mouse, speakers, microphone, and/or other peripheral devices. Sensors 207 are coupled to the I/O subsystem 210 and may be embodied as one or more sensors. According to an embodiment of the disclosure, the sensors 207 may include one or more motion, location, and proximity sensors. A network controller (not shown) may also be coupled to the I/O subsystem 210. The network controller may link the computer system 200 to a network of computers (not shown) and supports communication among the machines. It should be appreciated that computing devices having a different architecture or having different components may also be used to implement the computing device 200.

Figure 3:
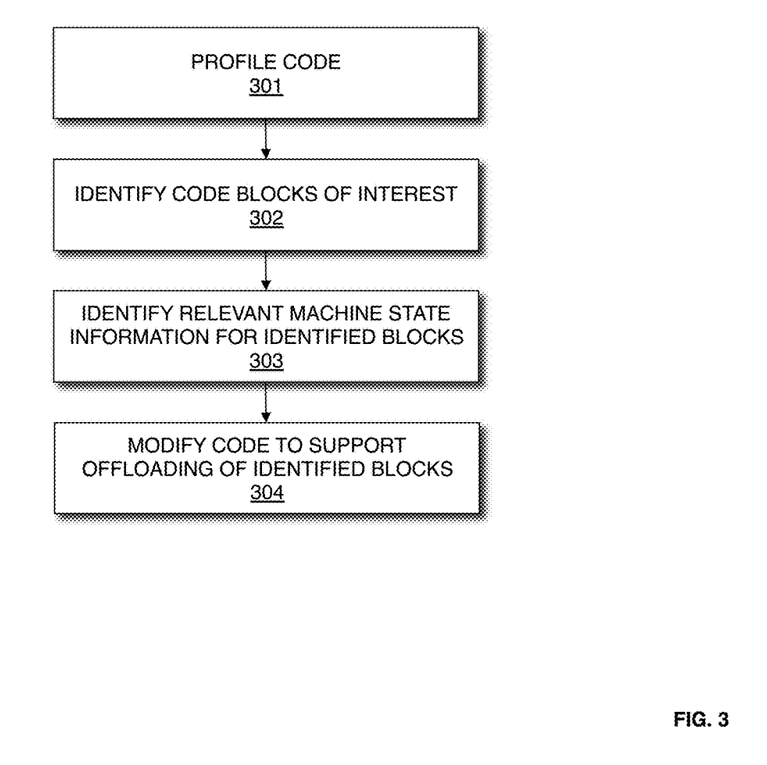
FIG. 3 is a flow chart illustrating a method for processing machine code for execution offloading according to an exemplary embodiment of the present disclosure.

FIG. 3 is a flow chart illustrating a method for processing machine code for execution offloading according to an exemplary embodiment of the present disclosure. According to an embodiment of the present disclosure, the procedure described in FIG. 3 may be performed by a software developer tool executed on a computing device.

At 301, code to be executed on a first computing device is profiled. According to an embodiment of the present disclosure, profiling the execution of the code may include determining how often various code blocks are executed. Profiling the execution of code may include identifying which memory addresses are read from and/or written to and the frequency. Profiling the execution of code may include identifying the call chain(s) of code blocks and determining the computer processing unit (CPU) cycles required for the call chain(s) or a portion of a call chain(s). Profiling the execution of code may also include identifying the instructions that include a call chain or a portion of a call chain or other collection tasks.

At 302, code blocks of interest are identified. According to an embodiment of the present disclosure, a code block may be of interest if a determination is made that performance gains of offloading the code block to be executed at a server outweighs the overhead cost of the offloading. It should be appreciated that other criteria may also be used to identify code blocks of interest.

At 303, relevant machine state information is identified for the code blocks of interest. According to an embodiment of the present disclosure, the relevant machine state information identifies a subset of the machine state of the first computing device and the location of the subset of the machine state in virtual memory, where the subset of machine state is required to offload execution of the code block. The subset of the machine state may be identified from the profiling performed at 301. The machine state may include the computing device's register values and locations and contents of its virtual memory that include, for example, the stack, heap, block started by symbol (BSS) data, and text regions.

At 304, the code block is modified to support offloading execution of the code block onto a second computing device. According to an embodiment of the present disclosure, calls are inserted into code block to facilitate offloading of its execution. The modified code also identifies the subset of machine states that should be replicated from the first computing device onto the second computing device and where the subset of machine states are located on the first computing device. In one embodiment, a set of virtual memory address ranges are provided which includes the subset of machine states.

Figure 4:
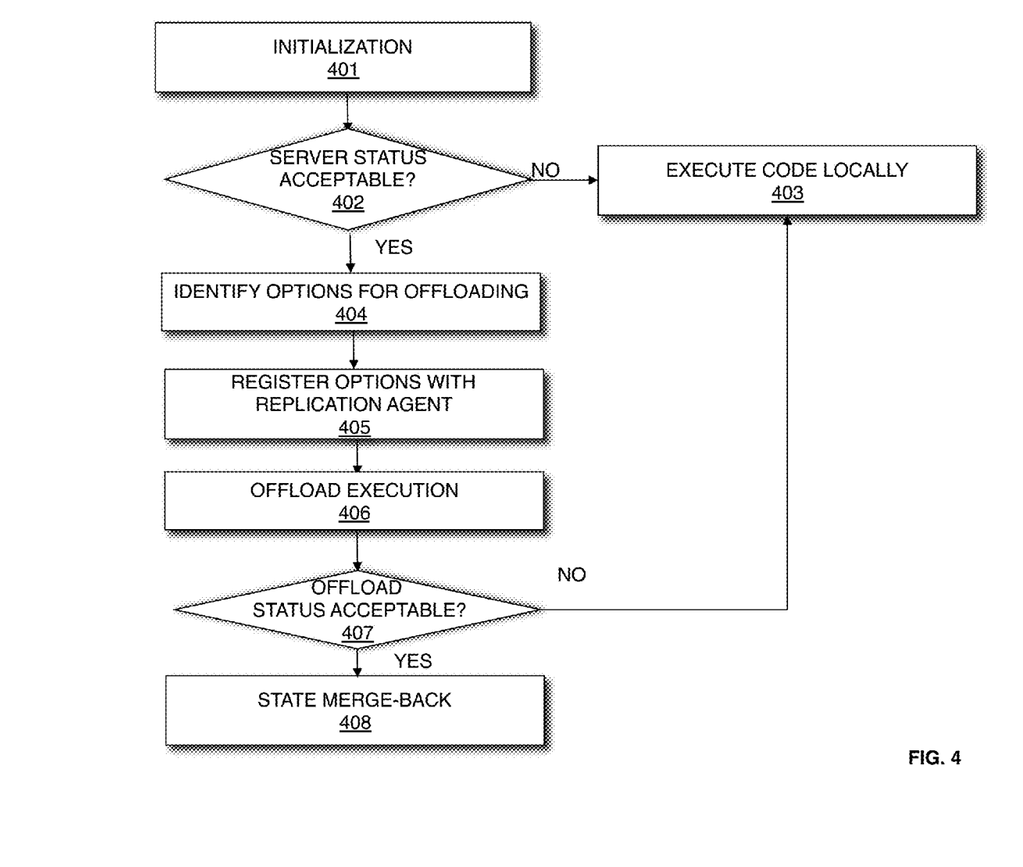
FIG. 4 is a flow chart illustrating a method for offloading execution of machine code from a first computing device that operates as a client to a second computing device that operates as a server according to an exemplary embodiment of the present disclosure.

FIG. 4 is a flow chart illustrating a method for offloading execution of machine code from a first computing device that operates as a client to a second computing device that operates as a server according to an exemplary embodiment of the present disclosure. According to an embodiment of the present disclosure, the procedure described in FIG. 4 may be performed by the first computing device 110 illustrated in FIG. 1.

At 401, initialization is performed. According to an embodiment of the present disclosure, an initialization message is transmitted to a computing device that operates as a server. The initialization message may request a status from the server or specific information about the server.

At 402, a determination is made about the status of the server. According to an embodiment of the present disclosure, the status of the server may be based on its connection, the traffic on the server, processing capabilities, and/or other criteria or information requested from the server. If a determination is made that the status of the server is not acceptable, control proceeds to 403. If a determination is made that the status of the server is acceptable, control proceeds to 404. According to an embodiment of the present disclosure, an initialization message may be sent to more than one server at 401 and a determination may be made that the status of more than one server may be acceptable at 402.

At 403, the code is executed locally on the client and offloading is bypassed.

At 404, options for offloading the execution of blocks of code are identified. According to an embodiment of the present disclosure, a determination is made as to which blocks of code to offload and which server to use if more than one server is available. Code blocks that are to be offloaded for execution may be referred to as target code blocks. A target code block may include machine code that describes a function or only a portion of a function.

At 405, the options for offloading are registered with a replication agent where a subset of machine state of the client is replicated on the server. According to an embodiment of the present disclosure, replicating the subset of machine state of the client includes transmitting contents of a virtual memory address range specified in the code that include the text, heap, data, and BSS regions. Replicating the subset of machine state of the client also includes marking a region in the text that identifies the code to be executed on the server with a target code flag. Replicating the subset of machine state of the client further includes transmitting contents of a stack to the server. According to an embodiment of the disclosure, the contents of the stack that is replicated may be determined by inspecting a register that holds a stack pointer and a register that holds a stack base pointer. Replicating the subset of machine state of the client also includes transmitting the contents of the registers on the client to the server. The subset of machine states of the client replicated on the server includes a current version update number. According to an embodiment of the present disclosure, the subset of machine states is registered with the replication agent. Changes to the machine state over the course of execution of the application on the client are replicated on the server by the replication agent. This allows for continuous replication of the subset of machine states.

At 406, execution of the target code block is offloaded onto the server.

At 407, it is determined whether an offload status is acceptable. According to an embodiment of the present disclosure, an offload status may be unacceptable if an error occurs when offloading execution of a target code block or no response is received from the server after a predetermined period of time. If a determination is made that the offload status is not acceptable, control proceeds to 403. If a determination is made that the offload status is acceptable, control proceeds to 408.

At 408, state merge-back is performed where an updated subset of machine state from the server is replicated onto the client. The updated subset of machine state reflects execution of the target code block on the server. According to an embodiment of the present disclosure, upon receiving an update subset of machine state from the server, a version update number on the updated subset of machine state from the server is compared with the current version update number. If the version update number of the updated subset of machine state from the server matches the current version update number, the subset of machine state on the client is overwritten with the updated subset of machine state from the server. According to an embodiment of the present disclosure, the virtual memory (heap, BSS, data, and stack) and registers are updated on the client in the order given. The version update number is incremented upon completion of the state merge-back. A current instruction pointer of the client may be set to an endpoint of the target code block.

Figure 5:
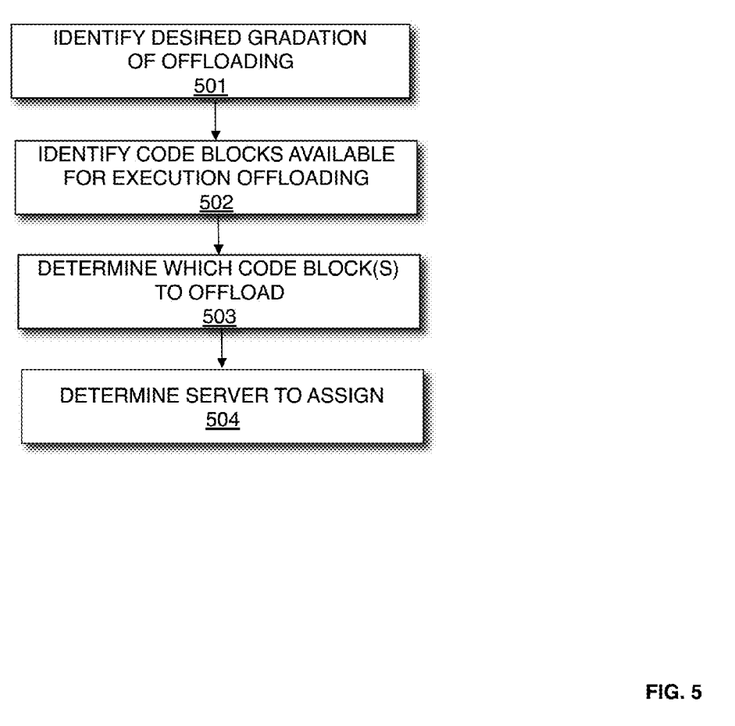
FIG. 5 is a flow chart illustrating a method for identifying options for offloading execution of machine code according to an exemplary embodiment of the present disclosure.

FIG. 5 is a flow chart illustrating a method for identifying options for offloading execution of machine code according to an exemplary embodiment of the present disclosure. According to an embodiment of the present disclosure, the method illustrated in FIG. 5 may be used to implement procedure 404 illustrated in FIG. 4.

At 501, a desired gradation of offloading is identified. The gradation of offloading corresponds to a degree of offloading execution of machine code that is desired for an application. According to an embodiment of the present disclosure, the desired gradation of offloading may be specified by a user of a first computing device executing machine code of the application. The gradation of offloading may also be specified dynamically by an agent on the first computing device upon determining that power, processing resources, or other computing resources on the first computing device should be conserved. It should be appreciated that a gradation of offloading desired may be characterized by a type of workload or by a size of a code block. According to an embodiment of the present disclosure, a user may specify a preference for aggressive, moderate, or light offloading. In this embodiment, an aggressive offloading may result in offloading all possible target code blocks, where a light offloading may result in offloading a designated percentage of target code block by call frequency.

At 502, code blocks available for execution offloading are identified. According to an embodiment of the present disclosure, the code blocks available for offloading may be identified by parsing the code to determine which code blocks have inserted calls that facilitate execution offloading. The code blocks available for execution offloading also identify a subset of machine states that should be replicated and where the subset of machine states is located.

At 503, a determination is made as to which code block or code blocks to offload. According to an embodiment of the present disclosure, the determination may be made in response to the desired gradation of offloading. For example, a larger number of blocks of code may be offloaded when the desired gradation of offloading is higher.

At 504, if more than one server is available for accepting offloaded code for execution, a determination is made as to which server to assign the code. According to an embodiment of the present disclosure, the determination may be based upon a network latency between the client and a server, the processing load of a server, or other criteria.

Figure 6:
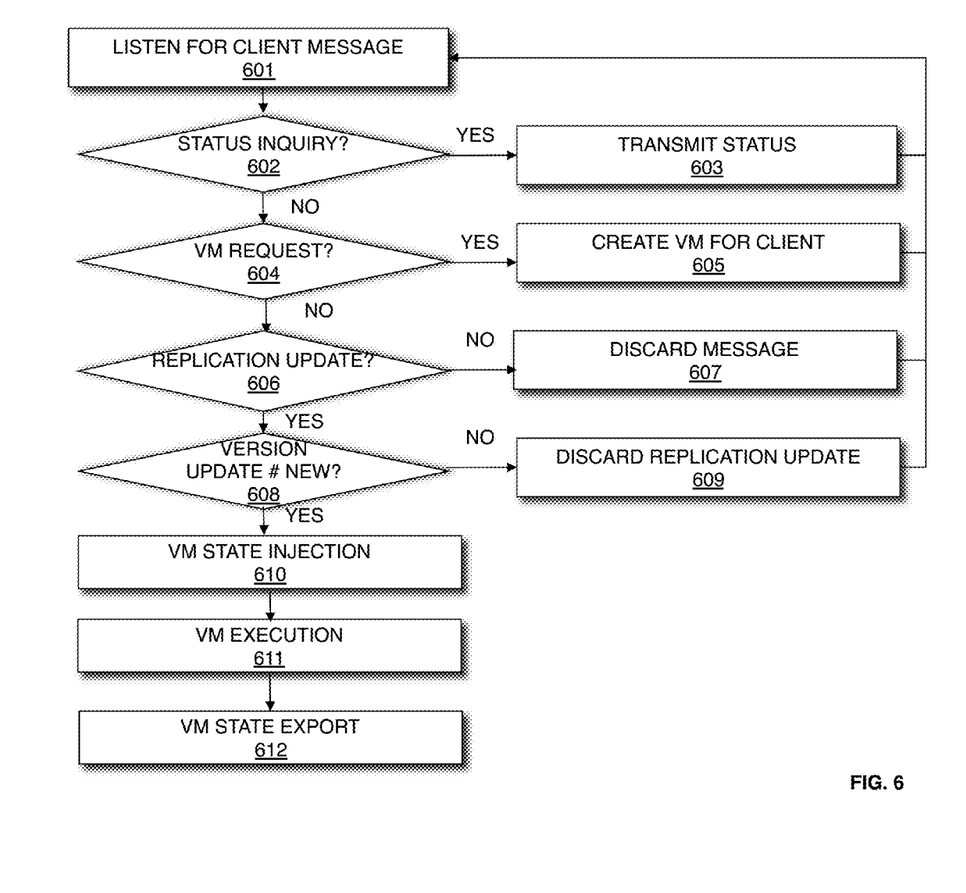
FIG. 6 is a flow chart illustrating a method for managing offloaded execution of machine code on a server according to an exemplary embodiment of the present disclosure.

FIG. 6 is a flow chart illustrating a method for managing offloaded execution of machine code on a server according to an exemplary embodiment of the present disclosure. According to an embodiment of the present disclosure, the method described in FIG. 6 may be performed by the second computing device 120 illustrated in FIG. 1.

At 601, control listens for a message from a client.

At 602, it is determined whether a message received from the client is a status inquiry. If the message received from the client is a status inquiry, control proceeds to 603. If the message received from the client is not a status inquiry, control proceeds to 604.

At 603, a status of the server is transmitted to the client. According to an embodiment of the present disclosure, the status may indicate that the server is operable. The status may also provide information about the processing resources of the server, the processing load of the server, the network latency between the server and the client, and/or other information that may be used by the client to determine whether to select the server for execution of code.

At 604, it is determined whether a message received from the client is a request to create a virtual machine (VM). According to an embodiment of the present disclosure, a request to create a VM may be received from the client when the server is selected to execute code from the client. If the message from the client is a request to create a VM, control proceeds to 605. If the message from the client is not a request to create a VM, control proceeds to 606.

At 605, a VM is created. According to an embodiment of the present disclosure, a single virtual central processing unit (VCPU) and virtual memory is created for the VM. The virtual memory may be a memory mapped host memory block and may be configurable. A guest root physical page table is setup within the virtual memory. The VM is not launched until a replication update is received from the client.

At 606, it is determined whether a replication update is received from the client. If a replication update is not received from the client, control proceeds to 607. If a replication update is received from the client, control proceeds to 608.

At 607, the message from the client is discarded.

At 608, it is determined whether a version update number of a replication update received from the client is a new version update number. According to an embodiment of the present disclosure, if the version update number is less than or equal to a current version update number, the version update number is not new. If the version update number is not new, control proceeds to 609. If the version update number is new, control proceeds to 610.

At 609, the replication update associated with the old version update number is discarded.

As illustrated in FIG. 6, embodiments of the present disclosure listen for three exemplary message types. It should be appreciated that additional message types may be listened for, identified, and processed.

At 610, the VM is injected with information from the replication update received from the client. According to an embodiment of the present disclosure, the replication update includes a subset of machine state from the client that includes a list of virtual memory addresses ranges and their contents. These become guest virtual memory addresses inside the client designated VM. For each address range received, proper page table structures and guest physical pages are allocated and set up in the VM's guest physical memory such that the virtual addresses are resolvable inside the VM. Subsequently, the server copies the corresponding contents into proper locations within the guest physical memory according to the guest page tables.

In the subset of machine state target code received from the client, a target code flag is set for an address range that includes the target code block to be executed. When the target code block is copied into the guest physical memory in the VM, it is appended with footer code that instructs the VM to return control of computing resources to the server. According to an embodiment of the present disclosure, the footer code may be implemented with the following instructions.

mov eax, 0Xdeadc0de
vmcall

The page tables in the VM are setup to properly address a situation where the footer code pushes past a page boundary onto a new page. After the register state is copied into the VM's registers, the VM is ready to launch. The current version update number is overwritten with the new version update number.

At 611, the VM is run. According to an embodiment of the present disclosure, the VM is run only when a target code block has been installed. This occurs when a replication update has the target code flag set. Otherwise the server continues listening for client messages and injecting updates. According to an embodiment of the present disclosure, the VM's instruction pointer register is set to the beginning of the target code block and the target code block will begin execution. The VM will stop after the appended footer code is executed. At this point, the vmcall is trapped by a kernel module, which hands control of computing resources back to the server.

At 612, an updated subset of machine state of the VM on the server is exported to the client. After completing execution of the target code block, the machine state of the VM on the server would be identical to the machine state of the client had the client completed execution of the target code block. The updated subset of machine state of the VM is exported to the client by replicating the VM virtual memory (including heap, data, BSS, stack) and register state onto the client. The current version update number of the replication update is transmitted with the updated subset of machine state to the client.

As illustrated in FIG. 6, a message from the client may be either a status inquiry, VM request, or a replication update, where each type of message may generate a different response from the server. It should be appreciated, however, that a message from the client may also include a combination of the exemplary messages disclosed and that a combination of the responses disclosed may be performed together as a result. For instance, a client may send a message that includes both a VM request together with a replication update. In this instance, the server may perform a combination of procedures 605-612.

FIGS. 3-6 are flow charts illustrating methods according to exemplary embodiments of the present disclosure. Some of the techniques illustrated in these figures may be performed sequentially, in parallel or in an order other than that which is described. Furthermore, some of the methods illustrated may be repeated in a loop or performed iteratively. It should be appreciated that not all of the techniques described are required to be performed, that additional techniques may be added, and that some of the illustrated techniques may be substituted with other techniques.

Figure 7:
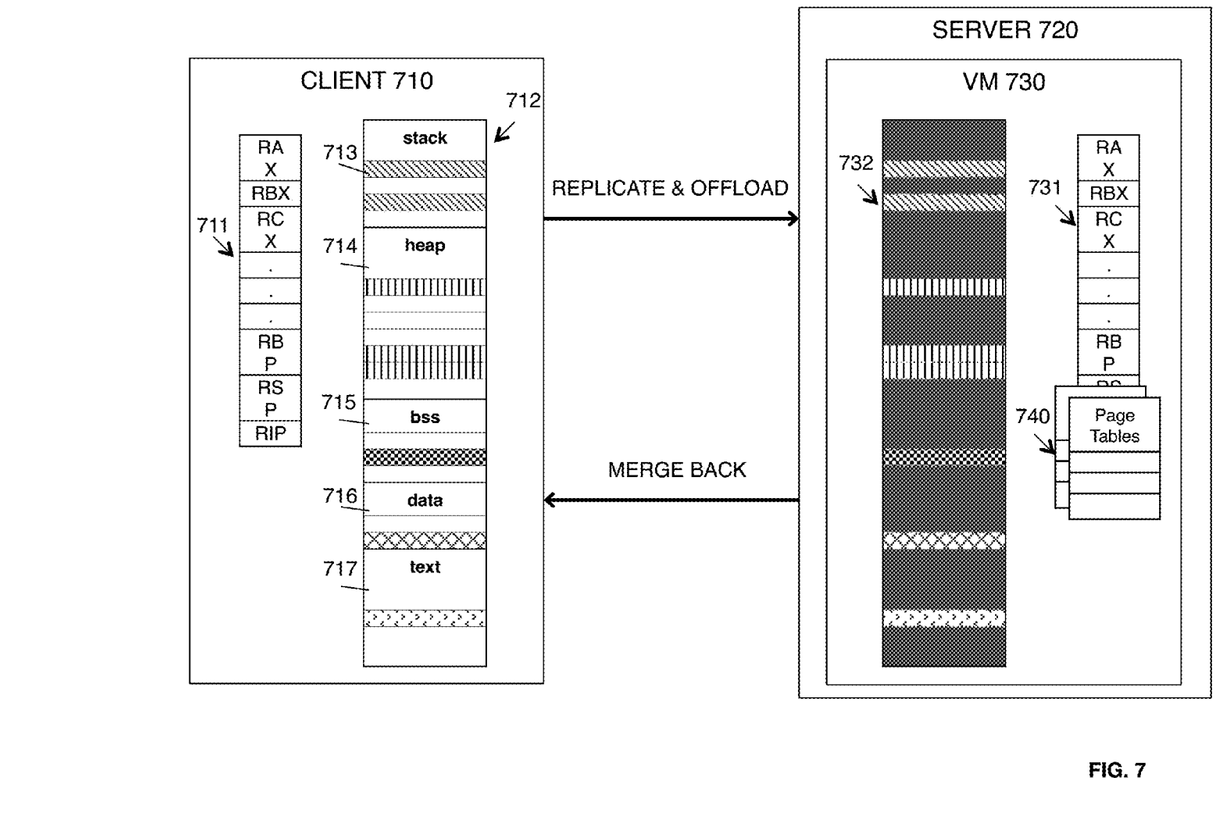
FIG. 7 is an illustrative example of machine state replication to support offloading execution of machine code according to an exemplary embodiment of the present disclosure.

FIG. 7 is an illustrative example of machine state replication to support offloading execution of machine code according to an exemplary embodiment of the present disclosure. Client 710 is implemented by a first computing device. A memory inside client 710 includes a first section 711 which stores register values. A second section 712 in memory includes locations for storing a stack 713, heap 714, BSS 715, data 716, and text 717.

When a decision is made to use server 720 to execute target code block from client 710, a subset of a machine state of client 710 is replicated and offloaded onto server 720. The subset of machine state of the client 710 includes register values 711, and values from the stack 713, heap 714, BSS 715, data 716, and text 717.

Server 720 is implemented by a second computing device. The server 720 implements a VM 730 which includes a first section 731 of virtual registers which stores register values replicated from a machine state of client 710. The VM includes a second section 732 of virtual memory which includes locations for storing the stack, heap, BSS, data, and text replicated from the subset of machine state of the client 710. The virtual memory also includes a third section 740 which implements a page table that may be used to map virtual addresses to physical addresses in the VM.

After the target code block is executed on the VM 730 in the server 720, the subset of machine states of the VM 730 is transmitted to the client to be merged back into memory. By merging the subset of machine state of the VM 730, the machine state of the client 710 is advanced as if the target code block had been executed locally on the client 710.

Figure 8:
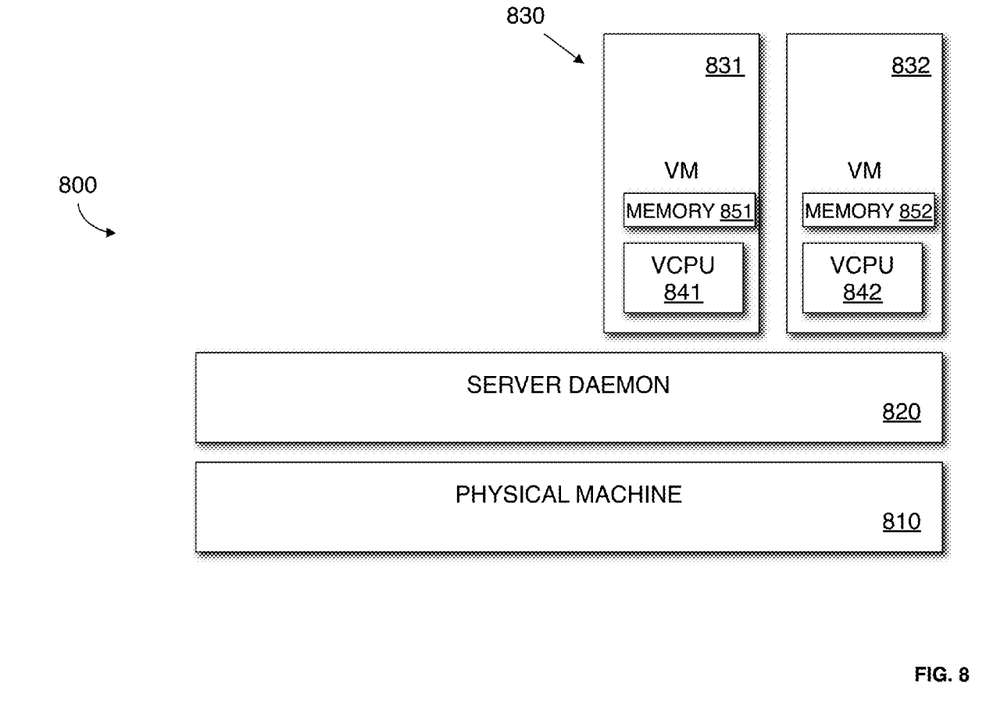
FIG. 8 is a block diagram of a virtual machine implemented on a server computing device according to an exemplary embodiment of the present disclosure.

FIG. 8 is a block diagram of virtual machines 831 and 832 implemented on a server 800 according to an exemplary embodiment of the present disclosure. The server 800 includes a physical machine 810. According to one embodiment, the physical machine 810 may include components of a computing device such as, for example, one or more processors, a memory, buses, and various I/O devices.

The server 800 includes a server daemon 820. The server daemon 820 is a layer that interfaces the physical machine 810 and that facilitates the creation and running of one or more VMs 830. According to an embodiment of the present disclosure, the server daemon 820 may be a sequence of instructions stored in a memory of a computing device. The server daemon 820 manages and mediates computing device resources in the physical machine 810 between the VMs 830 and allows the isolation of or data sharing between the VMs 830. The server daemon 820 achieves this isolation or sharing by virtualizing resources in the physical machine 810 and exporting a virtual hardware interface that could reflect an underlying architecture of the physical machine 810, a variant of the physical machine, or an entirely different physical machine.

The server 800 includes one or more VMs 831-832 (collectively shown as 830). According to an embodiment of the present disclosure, a VM may be described as an isolated model of a machine including, but not limited to, a replica of the physical machine 810, a subset of the physical machine 810, or model of an entirely different machine. A VM may include the resources of the computer device in the physical machine 810, a subset of the resources of the computing device in the physical machine 810, or entirely virtual resources not found in the physical machine.

According to an embodiment of the present disclosure, the server daemon 820 listens for replication updates from a client. When a new replication update is received, the server daemon 820 injects a subset of a machine state of the client from information in the replication update into the appropriate VM. The machine state information may include a target code block for a VM to execute. After a VM finishes executing the target code block, the server daemon 820 replicates the machine state of the VM onto the client as an updated subset of a machine state.

It should be appreciated that the server 800 may run different types of operating systems. According to an embodiment of the present disclosure, the server 800 runs a Linux operating system and utilizes a Kernel-based Virtual Machine (KVM) with the server daemon 820 to create and manage VMs 130.

Figure 9:
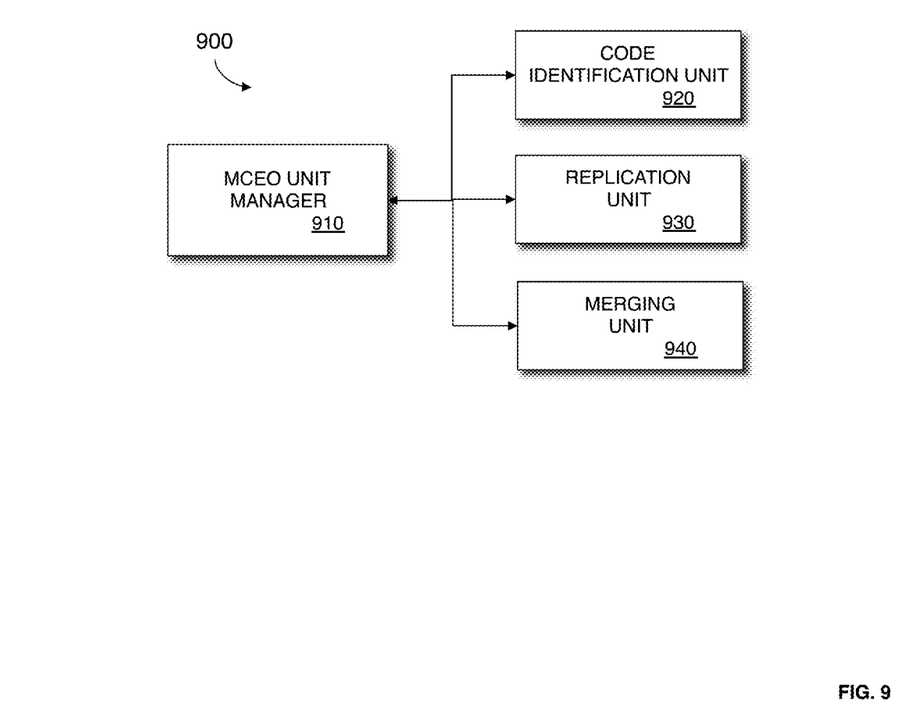
FIG. 9 is a block diagram of a machine code execution offloading unit according to an exemplary embodiment of the present disclosure.

FIG. 9 is a block diagram of a machine code execution offloading (MCEO) unit 900 according to an exemplary embodiment of the present disclosure. The MCEO unit 900 includes a MCEO unit manager 910. The MCEO unit manager 910 is coupled to and transmits information between components in the MCEO unit 900.

The MCEO unit 900 includes a code identification unit 920. The code identification unit 920 identifies machine code on a first computing device to offload to a second computing device. According to an embodiment of the present disclosure, the code identification unit 920 identifies the machine code in response to a user selected setting indicating a gradation of offloading that is desired. The machine code may be a code block that describes a function or a portion of a function.

The MCEO unit 900 includes a replication unit 930. The replication unit 930 replicates a subset of a machine state of the first computing device onto the second computing device, wherein the subset of the machine state is required to execute the machine code. According to an embodiment of the present disclosure, the subset of the machine state includes register values and virtual memory address ranges and contents that include stack, heap, block started by symbol (BSS), data, and text regions.

The MCEO unit 900 includes a merging unit 940. The merging unit 940 overwrites the subset of the machine state with an updated subset of the machine state from the second computing device, wherein the updated subset of the machine state reflects an execution of the machine code at the second computing device.

It should be appreciated that the MCEO unit 900 may further perform the procedures described with reference to FIGS. 4 and 5.

FIG. 9 illustrates modules implementing embodiments of a MCEO unit 900. According to one embodiment, the modules represent software modules and operations may be performed by a computer system such as the one illustrated in FIG. 2 executing sequences of instructions represented by the modules shown in FIG. 9. In alternate embodiments, hard-wire circuitry may be used in place of or in combination with software instructions to implement embodiments of present disclosure. Thus, embodiments of present disclosure are not limited to any specific combination of hardware circuitry and software.

The following examples pertain to further embodiments. In one embodiment, a non-transitory computer-readable medium having sequences of instructions, the sequences of instructions including instructions which, when executed, cause a processor to perform a method of replicating a subset of a machine state of a first computing device onto a second computing device, wherein the subset of the machine state is required to execute machine code. Execution of the machine code is offloaded to the second computing device.

In a further embodiment, replicating the subset of the machine state includes replicating register values, and replicating virtual memory address ranges and contents that include stack, heap, block started by symbol (BSS), data, and text regions.

In a further embodiment, the machine code describes a function.

In a further embodiment, the machine code describes a portion of a function.

In a further embodiment, the above-identified non-transitory computer-readable medium further includes identifying the machine code on the first computing device to offload to the second computing device.

In a further embodiment, identifying the machine code is performed in response to a user selected setting indicating a gradation of offloading that is desired.

In a further embodiment, the gradation of offloading that is desired may be characterized by aggressive, moderate, and light offloading.

In a further embodiment, the above-identified non-transitory computer-readable medium further includes assigning a version update number to the replicated subset of machine state.

In a further embodiment, the above-identified non-transitory computer-readable medium further includes executing the machine code on the first computing device if a period of time has expired without receiving an updated subset of machine state from the second computing device.

In a further embodiment, the above-identified non-transitory computer-readable medium further includes receiving an updated subset of machine state from the second computing device, wherein the updated subset of the machine state reflects an execution of the machine code at the second computing device. The subset of the machine state is overwritten with the updated subset of the machine state. A current instruction pointer of the first computing device is set to an endpoint of the machine code.

In a further embodiment, the overwriting is performed if the updated subset of machine state has a current version update number.

In a further embodiment, the above-identified non-transitory computer-readable medium further includes incrementing the current version update number after the overwriting.

In a further embodiment, a method for managing computing includes replicating a subset of a machine state of a first computing device onto a second computing device, wherein the subset of the machine state is required to execute machine code. Execution of the machine code is offloaded to the second computing device.

In a further embodiment, replicating the subset of the machine state includes replicating register values, and replicating virtual memory address ranges and contents that include stack, heap, block started by symbol (BSS), data, and text regions.

In a further embodiment, the machine code describes a function.

In a further embodiment, the machine code describes a portion of a function.

In a further embodiment, the above referenced method further includes identifying the machine code on a first computing device to offload to a second computing device.

In a further embodiment, the above referenced method further includes identifying the machine code in response to a user selected setting indicating a gradation of offloading that is desired.

In a further embodiment, the gradation of offloading that is desired may be characterized by aggressive, moderate, and light offloading.

In a further embodiment, the above referenced method further includes assigning a version update number to the replicated subset of machine state.

In a further embodiment, the above referenced method further includes executing the machine code on the first computing device if a period of time has expired without receiving an updated subset of machine state from the second computing device.

In a further embodiment, the above referenced method further includes receiving an updated subset of machine state from the second computing device, wherein the updated subset of the machine state reflects an execution of the machine code at the second computing device. The subset of the machine state is overwritten with the updated subset of the machine state. A current instruction pointer of the first computing device is set to an endpoint of the machine code.

In a further embodiment, the overwriting is performed if the updated subset of machine state has a current version update number.

In a further embodiment, a non-transitory computer-readable medium having sequences of instructions, the sequences of instructions including instructions which, when executed, causes a processor to perform the procedures from any one of the methods described above.

In a further embodiment, an apparatus includes means to perform the procedures from any one of the methods described above.

In a further embodiment, a method for managing computing includes creating a virtual machine (VM) for a client on a server. A replicated machine state and machine code, received from the client, is injected into the VM. Control of computing resources on the server is handed to the VM to execute the machine code. Control of the computing resources is returned to the server upon completion of execution of the machine code.

In a further embodiment, the above referenced method further includes exporting updated machine state in the VM to the client, wherein the updated machine state reflects execution of the machine code on the server.

In a further embodiment, creating the VM for the client includes generating a virtual central processing unit and a memory mapped host memory block.

In a further embodiment, the replicated machine state received from the client includes register values, and virtual memory address ranges and contents that include stack, heap, block started by symbol (BSS), data, and text regions.

In a further embodiment, the above referenced method further includes identifying a target code flag in the machine code. Footer code is added in the machine code at a location of the target code flag that instructs the VM to return control of the computing resources to the server.

In a further embodiment, a machine code execution offloading unit includes a code identification unit that identifies machine code on a first computing device to offload to a second computing device. The machine code execution offloading unit includes a replication unit that replicates a subset of a machine state of the first computing device onto the second computing device, wherein the subset of the machine state is required to execute the machine code. The machine code execution offloading unit includes a merging unit that overwrites the subset of the machine state with an updated subset of the machine state from the second computing device, wherein the updated subset of the machine state reflects an execution of the machine code at the second computing device.

In a further embodiment, the subset of the machine state includes register values, and virtual memory address ranges and contents that include stack, heap, block started by symbol (BSS), data, and text regions.

In a further embodiment, the code identification unit identifies the machine code in response to a user selected setting indicating a gradation of offloading that is desired.

In a further embodiment, the machine code describes a portion of a function.

In a further embodiment, a machine code execution offloading unit includes means for identifying machine code on a first computing device to offload to a second computing device. The machine code execution offloading unit includes means for replicating a subset of a machine state of the first computing device onto the second computing device, wherein the subset of the machine state is required to execute the machine code. The machine code execution offloading unit includes a means for overwriting the subset of the machine state with an updated subset of the machine state from the second computing device, wherein the updated subset of the machine state reflects an execution of the machine code at the second computing device.

In a further embodiment, the subset of the machine state includes register values, and virtual memory address ranges and contents that include stack, heap, block started by symbol (BSS), data, and text regions.

In a further embodiment, the code identification unit identifies the machine code in response to a user selected setting indicating a gradation of offloading that is desired.

Embodiments of the present disclosure may be provided as a computer program product, or software, that may include an article of manufacture on a machine accessible or machine readable medium having instructions. The instructions on the machine accessible or machine readable medium may be used to program a computer system or other electronic device. The machine-readable medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium" or "machine readable medium" used herein shall include any medium that is capable of storing, encoding, or transmitting a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

In the foregoing specification embodiments of the disclosure have been described with reference to specific exemplary embodiments thereof. It will, however, be evident that various modifications and changes may be made thereto without departing from the embodiments of the disclosure. Furthermore, it should be appreciated that specifics in the examples presented may be used anywhere in one or more of the disclosed embodiments.

What is claimed is:

1. A non-transitory computer-readable medium having sequences of instructions, the sequences of instructions including instructions which, when executed, cause a processor to perform a method, comprising:

identifying machine code on a first computing device to offload to a second computing device in response to a user selected setting indicating a gradation of offloading that is desired, wherein the gradation of offloading that is desired may be characterized by aggressive, moderate, and light offloading;

replicating a subset of a machine state of the first computing device onto the second computing device, wherein the subset of the machine state is required to execute the machine code; and offloading execution of the machine code to the second computing device.

2. The non-transitory computer-readable medium of claim 1, wherein replicating the subset of the machine state comprises replicating register values, and replicating virtual memory address ranges and contents that include stack, heap, block started by symbol (BSS), data, and text regions.

3. The non-transitory computer-readable medium of claim 1, wherein the machine code describes a function.

4. The non-transitory computer-readable medium of claim 1, wherein the machine code describes a portion of a function.

5. The non-transitory computer-readable medium of claim 1 further comprising assigning a version update number to the replicated subset of machine state.

6. The non-transitory computer-readable medium of claim 1 further comprising executing the machine code on the first computing device if a period of time has expired without receiving an updated subset of machine state from the second computing device.

7. The non-transitory computer-readable medium of claim 1 further comprising:
receiving an updated subset of machine state from the second computing device, wherein the updated subset of the machine state reflects an execution of the machine code at the second computing device;
overwriting the subset of the machine state with the updated subset of the machine state; and
setting a current instruction pointer of the first computing device to an endpoint of the machine code.

8. The non-transitory computer-readable medium of claim 1, wherein overwriting is performed if the updated subset of machine state has a current version update number.

9. The non-transitory computer-readable medium of claim 8 further comprising incrementing the current version update number after the overwriting.

10. The non-transitory computer-readable medium of claim 1 further comprising managing offloaded execution of the machine code by:
creating a virtual machine (VM) for a client on a server;
injecting a replicated machine state and machine code, received from the client, into the VM;
handing control of computing resources on the server to the VM to execute the machine code; and
returning control of the computing resources to the server upon completion of execution of the machine code.

11. The non-transitory computer-readable medium of claim 10 further comprising exporting updated machine state in the VM to the client, wherein the updated machine state reflects execution of the machine code on the server.

12. The non-transitory computer-readable medium of claim 10, wherein creating the VM for the client comprises generating a virtual central processing unit and a memory mapped host memory block.

13. The non-transitory computer-readable medium of claim 10, wherein the replicated machine state received from the client comprises register values, and virtual memory address ranges and contents that include stack, heap, block started by symbol (BSS), data, and text regions.

14. The non-transitory computer-readable medium of claim 10 further comprising:
identifying a target code flag in the replicated machine state received from the client; and adding footer code at an endpoint of the machine code that instructs the VM to return control of the computing resources to the server.

15. A method for managing computing, comprising:
identifying machine code on a first computing device to offload to a second computing device in response to a user selected setting indicating a gradation of offloading that is desired, wherein the gradation of offloading that is desired may be characterized by aggressive, moderate, and light offloading;
replicating a subset of a machine state of the first computing device onto the second computing device, wherein the subset of the machine state is required to execute the machine code; and
offloading execution of the machine code to the second computing device, wherein the identifying, replicating, and offloading is performed by a processor.

16. The method of claim 15, wherein replicating the subset of the machine state comprises replicating register values, and replicating virtual memory address ranges and contents that include stack, heap, block started by symbol (BSS), data, and text regions.

17. The method of claim 15 further comprising identifying the machine code in response to a user selected setting indicating a gradation of offloading that is desired.

18. The method of claim 15 further comprising:
receiving an updated subset of machine state from the second computing device, wherein the updated subset of the machine state reflects an execution of the machine code at the second computing device;
overwriting the subset of the machine state with the updated subset of the machine state; and
setting a current instruction pointer of the first computing device to an endpoint of the machine code.

19. A machine code execution offloading unit, comprising:
a code identification unit that identifies machine code on a first computing device to offload to a second computing device in response to a user selected setting indicating a gradation of offloading that is desired, wherein the gradation of offloading that is desired may be characterized by aggressive, moderate, and light offloading;
a replication unit that replicates a subset of a machine state of the first computing device onto the second computing device, wherein the subset of the machine state is required to execute the machine code; and
a merging unit that overwrites the subset of the machine state with an updated subset of the machine state from the second computing device, wherein the updated subset of the machine state reflects an execution of the machine code at the second computing device.

20. The machine code execution offloading unit of claim 19, wherein the subset of the machine state comprises register values, and virtual memory address ranges and contents that include stack, heap, block started by symbol (BSS), data, and text regions.

21. The machine code execution offloading unit of claim 19, wherein the code identification unit identifies the machine code in response to a user selected setting indicating a gradation of offloading that is desired.

22. The machine code execution offloading unit of claim 19, wherein the machine code describes a portion of a function.

23. A method for managing computing, comprising:
creating a virtual machine (VM) for a client on a server;

injecting a replicated machine state and machine code, received from the client, into the VM;

handing control of computing resources on the server to the VM to execute the machine code; and returning control of the computing resources to the server upon completion of execution of the machine code.

24. The method of claim 23 further comprising exporting updated machine state in the VM to the client, wherein the updated machine state reflects execution of the machine code on the server.

25. The method of claim 23, wherein creating the VM for the client comprises generating a virtual central processing unit and a memory mapped host memory block.

26. The method of claim 23, wherein the replicated machine state received from the client comprises register values, and virtual memory address ranges and contents that include stack, heap, block started by symbol (BSS), data, and text regions.

* * * * *